United States Patent Office 3,415,792
Patented Dec. 10, 1968

3,415,792
ANIONIC POLYMERIZATION OF LACTAMS WITH (1) ANIONIC CATALYST, (2) PROMOTER AND (3) PHENOLIC COMPOUND
Jan Šebenda, Prague, Czechoslovakia, assignor to Ceskoslovenska Akademie ved, Prague, Czechoslovakia, a corporation of Czechoslovakia
No Drawing. Filed June 18, 1965, Ser. No. 465,193
Claims priority, application Czechoslovakia, July 3, 1964, 3,850/64
9 Claims. (Cl. 260—78)

ABSTRACT OF THE DISCLOSURE

Polymerization of lactams is carried out by forming a mixture consisting essentially of (a) a solution in molten lactam of a lactam salt of a substance selected from the group consisting of alkali metals, alkaline earth metals and ammonia, (b) a free phenolic compound and (c) a polymerization activator; and maintaining said mixture at polymerization temperature.

---

According to contemporaneous ideas about the reaction mechanism of alkaline polymerization of lactams, the growth of the polymer chain occurs by addition of lactam anion to the carboxylic group of the imide-bound lactam. In alkaline lactam polymerization activated by suitable acid derivatives such as acid chlorides or acyl lactams only very strong bases as e.g. alkali metal lactam salts, hydrides, alcoholates, hydroxides or organometallic compounds have been used hitherto as initiators. Such catalytic systems are very active and the polymerization is finished in the neighborhood of the melting point of the resulting polyamide in several tens of a second. There will occur, however, besides the desired polymerization also some side reactions causing the extinction of catalytic system activity, so that a further polymerization at lower temperatures, decreasing the amount of extractives, is made difficult and almost impossible.

The study of the reaction mechanism of alkaline lactam polymerization has shown that alkyl imides condense very rapidly in a strongly basic medium and form products decreasing the basicity of the medium and simultaneously the concentration of the active imido group. It appeared for instance that in the system consisting of caprolactam sodium salt and acetyl caprolactam (molar ratio 1:2) the concentration of imido groups decreases at 80° C. during 5 minutes by 50%, so that the polymerizing system immediately after stirring the catalytic components into the same contains always substantially less imide groups than were added to the starting reaction mixture. The strongly basic lactam anions too are thereby converted to comparatively weaker bases. From the standpoint of maintaining high catalytic activity it is therefore useless to add strongly basic lactam polymerization initiators such as alkaline lactam salts, alcoholates, hydrides and alkyl metals at the beginning of polymerization.

Said strong bases not only accelerate the extinction of imide groups but they also can be prepared only with difficulty and the handling is not simple from the standpoint of safety. They are also sensitive against humidity and carbon dioxide of the atmosphere and must be therefore handled in dry inert gas.

When using alkali metal alcoholates for initiators there is established an equilibrium

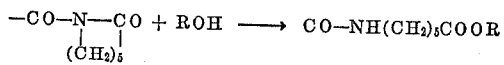

whereat both alcoholate and alcohol can react with the activator or with the acyl lactam group of the growing polymer chain, whereby active imide groups are destroyed and the concentration of one catalyst components is decreased:

$$-CO-N-CO + ROH \longrightarrow CO-NH(CH_2)_5COOR$$
$$\phantom{-CO-N-}|\phantom{CO + ROH}|$$
$$\phantom{-CO-N-}(CH_2)_5$$

The present method of activated alkaline polymerization of lactams is characterized by decreasing the basicity of the polymerization medium using as polymerization initiators medium basic phenolates of the type R.OMe, R being an aromatic group and Me a cation of the alkali metal or alkali earth metal series or ammonium cation. Thereby the life time of the catalytic system is extended in comparison with strongly basic initiators such as alkyl metals, alkali metal lactam salts and alkali metal hydrides. As initiators there are advantageously used salts of such acids which do not react with acyl lactam groups of the growing chain at polymerization conditions. If there is used as initiator a salt of an acid, which does not react (or which reacts only very slowly) with imide groups, the imide component of the catalytic system is not destroyed to such an extent as in the case of e.g. alcoholates and hydroxides, so that the catalytic activity is maintained for a considerably longer time. Thus e.g. phenolates of alkali metals are still sufficiently basic to form, by an equilibrium reaction, the necessary concentration of lactam anions causing rapid polymerization:

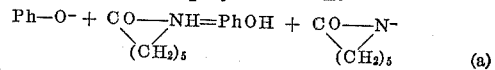
(a)

Simultaneously neither the phenol nor the phenolate cause imide condensation at an appreciable rate, so that they are inert against this component of the catalytic system. They are also not acylated. Particularly such phenolates are used, which possess large substituents in the neighborhood of the oxygen atom, hindering acylation of the phenol by the imide. An example of such a phenol is 2.6-di-tert-butyl-3-methyl phenol, which acts, in addition, as polymer stabilizer.

Alkali metal phenolate can be added either as such to the lactam-activator mixture, causing then equilibrium concentration of phenolate, phenol and lactam anion (reaction a), or by adding phenol to the lactam-sodium salt of lactam mixture. Optimum results are reached by adding phenol before adding the activator (imide or similar). It is thus substantially a buffered catalytic system, where the third component (phenol or similar weak acid which is not acylated by the imide) decreases the concentration of lactam (amide) anions. Thereby the basicity of the medium is lowered and condensation side reactions leading to destroying of imide groups and considerable decreasing of basicity are suppressed. Moderate decreasing of the polymerization rate, caused by the phenol acidity, is counterbalanced by substantial life time increase of the catalytic system. Thereby e.g. subsequent polymerization of the remaining lactam at lowered temperature is made possible. It is known, namely, that the lactam polymerization can be carried out to an equilibrium conversion only, the value of which is decreasing with increasing temperature. So e.g. caprolactam polymerization above the melting point of the resulting polyamide contains at least 8% of low molecular substances which can be extracted with water. Flakes or cut bands of such polymers are unsuitable for injection molding or extrusion; the high content of lower molecular substances is objectionable particularly in spinning fibres and filaments. A considerable effort was thus expended to decrease the monomer content in the polycapronamide by after-polymerization at temperatures below 200° C., the equilibrium content of the monomer being then only 2–3%. In usual activated alkaline polymerization using known catalytic systems such as a mixture of lactum sodium salt and acetyl caprolactam the catalytic activity decreases too rapidly. So e.g. after polymerization above 220° C. lasting for several minutes the content of catalytic components is so low that the after-polymerization is only very low (see Table 1).

The polymerization of 6-caprolactam containing 0.003 mol of caprolactam sodium salt and 0.003 mol tetra-acetyl hexamethylene diamine in one mol of caprolactam is illustrated in the following table:

TABLE 1

| Experiment No. | Polymerization time at— 250° C. | 175° C. | Polymer content, percent |
|---|---|---|---|
| 1 | 1 min | | 64.1 |
| 2 | 30 min | | 86.0 |
| 3 | 1 min | 180 min | 86.6 |
| 4 | 2.5 min | 180 min | 85.1 |

In Experiments Nos. 3 and 4 the polymerization was started at 250° C. and continued for a longer time at 175° C. The polymerization above the polyamide melting point is to be carried out for a minimum time only, in order to obtain a moldable mixture containing still a sufficient amount of the catalyst so that the after-polymerization at lower temperature is made possible. Exact maintenance of said minimum time is comparatively difficult, regarding the sensitivity of the alkaline polymerization against different impurities such as water from the air. The present method using a three-component system controls the basicity of the mixture by its buffering action and thus extends the life-time of the catalytic system. It is therefore no more necessary to carefully maintain the very short polymerization time above the polyamide melting point. Even if the polymerization time above the polyamide melting point is extended several times, the remaining catalytic activity is sufficiently high for an after-polymerization to high conversions at temperatures below the polyamide melting point. The equilibrium state, corresponding to said decreased temperatures, is safely reached in 2–3 hours. By the present method the usual extraction and drying of the cut polymer can be dispensed with. The polymerization above the polyamide melting point is sufficiently rapid so that it can be carried out continuously, the mixture staying in the reactor only for 1–5 minutes.

As far as comparatively weak bases have been used for alkaline lactam polymerization (e.g. KCN in DDR Patent No. 2719), this has been only in a non-activated polymerization, which thus runs much more slowly than in the present case. In absence of activators the reaction velocity is controlled by the equilibrium.

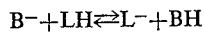
$$B^- + LH \rightleftarrows L^- + BH$$

(where $B^-$ is base, $LH$ is lactam and $L^-$ lactam anion) and also by the rate of building activating imide groups by a disproportion reaction, which is comparatively slow.

The present invention thus has the advantage of considerably high and fully reproducible polymerization rates with extended activity of the catalytic system, the destroying of imide groups and the decrease of basicity occurring in the buffered mixture of the initiator with a phenolic compound ROH much more slowly than without it. Besides it is possible to use also salts of the type ROMe, which are much easier to be prepared than e.g. alkali metal salts of lactams. Said advantages have considerable importance e.g. when lactam polymers with low monomer content are to be manufactured, or when the equilibrium between monomer and polymer is to be reached with some slowly polymerizing lactams (e.g. some O-alkyl lactams).

As activators any known compounds proposed for this purpose hitherto can be used, particularly N-acyl lactams such as N-acetyl caprolactam, N-benzoyl caprolactam, N-benzoyl pyrrolidone etc. or N-disubstituted carboxylic acid amides, or esters such as phenyl acetate, isocyanates such as phenyl iso-cyanate and many others.

The following example illustrates the invention without, however, limiting its scope.

EXAMPLE 1

0.115 g. N-acetyl caprolactam was dissolved at 100° C. in 11.3 g. 6-caprolactam and after increasing the temperature to 180° C. 0.116 g. sodium phenolate was stirred in. The reaction mixture was then put into a thermostat heated to 180° C. After 135 min. the polymer content was 92.2%.

EXAMPLE 2

To a mixture containing 5.65 g. 6-caprolactam, 0.405 g. sodium salt of caprolactam and 0.046 p-tert. butoxyphenol was added 0.085 g. tetra-acetyl hexamethylene diamine at 100° C. After the last component has been dissolved the mixture was maintained at 220° C. for 10 minutes. The polymer content was then 85.9%.

EXAMPLE 3

0.0628 g. caprolactam sodium salt and 0.1039 g. 2,6-di-tert.butyl-4-methyl phenol were dissolved at 100° C. in 8.74 g. 6-caprolactam. In the resulting solution 0.068 g. tetra-acetyl hexamethylene diamine was dissolved and the whole was polymerized for 10 minutes in a heating bath at 22° C. The polymer content was 91.0%.

EXAMPLE 4

Reaction mixture of the same composition as in Example 3 was polymerized for 180 minutes at 190° C. The polymer content was 96.6%.

EXAMPLE 5

A reaction mixture of the same composition as in Example 3 was polymerized for 3 minutes at 220° C. and then for 180 minutes at 190° C. The polymer content was 96.6%.

EXAMPLE 6

0.168 g. sodium salt of 2,6-di-tert.butyl-4-methyl phenol was dissolved at 70° C. in 12.7 g. of a mixture of C-methyl caprolactam isomers. After raising the temperature to 195° C. 0.120 g. N-butyryl caprolactam was added. After 4 hours the reaction product showed properties of usual C-methylcaprolactam polymers.

EXAMPLE 7

0.083 g. phenyl-iso-cyanate was added to a solution of 0.096 g. sodium phenolate in 16.8 g. dodecanolactam at 150° C. and the reaction mixture was maintained at 185° C. for 2 hours. There was obtained a tough polymer containing less than 1% of substances extractible by water.

Instead of plain or substituted phenol mentioned in the above examples any other aromatic hydroxy compounds with similar acidity can be used in the form of salts either added as such or build in situ. So e.g. different naphthol, phenyl phenol and similar, substituted or not, can be used.

Alkali metals in the sense of the invention involve not only sodium, which is most easily accessible, but also lithium, cesium, rubidium and potassium. Although all alkali earth metals can be used, calcium and magnesium are preferred as their compounds can be most easily prepared.

Strongly basic substituted ammonium such as tetramethyl ammonium, tetraethyl ammonium, triethylacetyl ammonium, trimethyl lauryl ammonium or trimethyl benzyl ammonium may also be used in the form of a salt of the above mentioned phenolic compounds.

I claim:

1. A method of polymerizing lactams, comprising the steps of forming a mixture consisting essentially of (a) a solution in molten lactam of a lactam salt of a substance selected from the group consisting of alkali metals, ammonia and alkaline earth metals, said lactam of said salt and said molten lactam, respectively, having at least seven ring members, (b) a free phenolic compound and (c) a polymerization activator; and maintaining said mixture at a polymerization temperature of between about 175 and 250° C.

2. A method as defined in claim 1, wherein said lactam of said salt and said molten lactam, respectively, are caprolactams.

3. A method as defined in claim 1, wherein said substance is selected from the group consisting of alkali metals and ammonia.

4. A method as defined in claim 1, wherein said free phenolic compound has the formula R—OH, wherein R is a phenyl group, a C-alkyl substituted phenyl radical or a 2,6-dialkylphenyl.

5. A method as defined in claim 4, wherein R is a phenyl group.

6. A method as defined in claim 4, wherein R is a C-alkyl substituted phenyl radical.

7. A method as defined in claim 4, wherein R is a 2,6-di-lower-alkylphenyl.

8. A method as defined in claim 1, wherein said lactam of said salt and said molten lactam, respectively, are caprolactams, and said substance is selected from the group consisting of alkali metals and ammonia.

9. A method as defined in claim 8, wherein said free phenolic compound has the formula R—OH, wherein R is a phenyl group, a C-alkyl substituted phenyl radical or a 2,6-dialkylphenyl.

References Cited

UNITED STATES PATENTS 3,015,652  1/1962  Schnell et al.
3,061,592  10/1962  Schnell et al.

WILLIAM H. SHORT, *Primary Examiner.*

F. D. ANDERSON, *Assistant Examiner.*